(12) United States Patent
Ide et al.

(10) Patent No.: US 11,899,479 B2
(45) Date of Patent: Feb. 13, 2024

(54) DIGITALLY CONTROLLED LOW DROPOUT REGULATOR

(71) Applicant: SONY SEMICONDUCTOR SOLUTIONS CORPORATION, Kanagawa (JP)

(72) Inventors: Daisuke Ide, Kanagawa (JP); Nobuhiko Shigyo, Kumamoto (JP); Keita Komagata, Tokyo (JP); Hiroyuki Watanabe, Kanagawa (JP); Takahiro Naito, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 232 days.

(21) Appl. No.: 17/616,228

(22) PCT Filed: Mar. 16, 2020

(86) PCT No.: PCT/JP2020/011332
§ 371 (c)(1),
(2) Date: Dec. 3, 2021

(87) PCT Pub. No.: WO2020/250522
PCT Pub. Date: Dec. 17, 2020

(65) Prior Publication Data
US 2022/0317712 A1 Oct. 6, 2022

(30) Foreign Application Priority Data
Jun. 11, 2019 (JP) ................. 2019-108411

(51) Int. Cl.
*G05F 1/575* (2006.01)
*G05F 1/56* (2006.01)
*H02M 1/00* (2006.01)

(52) U.S. Cl.
CPC ............... *G05F 1/561* (2013.01); *G05F 1/56* (2013.01); *G05F 1/575* (2013.01); *H02M 1/0045* (2021.05)

(58) Field of Classification Search
CPC ..... G05F 1/10; G05F 1/12; G05F 1/30; G05F 1/46; G05F 1/461; G05F 1/52; G05F 1/56;
(Continued)

(56) References Cited

U.S. PATENT DOCUMENTS 10,216,209 B1 * 2/2019 Ham ................... G05F 1/575
2004/0113829 A1 6/2004 Nakamoto et al.
(Continued)

FOREIGN PATENT DOCUMENTS

CN 105027210 A 11/2015
JP 2004-194066 A 7/2004
(Continued)

OTHER PUBLICATIONS

Lee, Anders Wen-Dao; "The design of a high precision, wide common mode range auto-zero comparator"; 2015; Massachusetts Institute of Technology; Thesis: M. Eng., Massachusetts Institute of Technology, Department of Electrical Engineering and Computer Science, 2015; pp. 21-29 (Year: 2015).*
International Search Report and Written Opinion of PCT Application No. PCT/JP2020/011332, dated Apr. 14, 2020, 08 pages of ISRWO.

*Primary Examiner* — Thienvu V Tran
*Assistant Examiner* — Shahzeb K Ahmad
(74) *Attorney, Agent, or Firm* — CHIP LAW GROUP

(57) ABSTRACT

To provide a digitally controlled LDO regulator that can control an output voltage even during an auto-zero processing period. A digitally controlled low dropout regulator is provided that includes a plurality of AD converters and an impedance variable circuit, each of the plurality of AD converters including a comparator, in which a first signal
(Continued)

from each of the plurality of AD converters is input to the impedance variable circuit; a second signal output from the impedance variable circuit is input to one of two terminals of each of the plurality of AD converters; when one of the plurality of AD converters is in operation, another of the plurality of AD converters performs auto-zero processing to set a voltage value used as a reference; and the comparator compares a voltage value of the second signal input to the one of the two terminals with the set voltage value.

7 Claims, 16 Drawing Sheets

(58) Field of Classification Search
CPC .......... G05F 1/561; G05F 1/563; G05F 1/565; G05F 1/575; G05F 1/59; G05F 1/625; G05F 1/66; H02M 3/04; H02M 3/06; H02M 3/07; H02M 3/077; H02M 3/158; H02M 3/1588; H02M 1/0045
See application file for complete search history.

(56) References Cited

U.S. PATENT DOCUMENTS

| | | |
|---|---|---|
| 2006/0226898 A1 | 10/2006 | Vitunic et al. |
| 2010/0188141 A1 | 7/2010 | Aruga et al. |
| 2014/0266143 A1* | 9/2014 | Saint-Laurent ......... G05F 1/462 |
| | | 323/353 |
| 2017/0212540 A1* | 7/2017 | Cho ..................... H03K 5/1534 |
| 2017/0337886 A1* | 11/2017 | Luo .......................... G09G 3/36 |
| 2018/0224875 A1* | 8/2018 | Ham ....................... G05F 1/466 |
| 2018/0292851 A1* | 10/2018 | Mahajan ............. H02M 1/0045 |

FOREIGN PATENT DOCUMENTS

| | | |
|---|---|---|
| JP | 2010-170470 A | 8/2010 |
| JP | 2016-511485 A | 4/2016 |
| JP | 2016-519356 A | 6/2016 |
| KR | 10-2015-0131198 A | 11/2015 |

* cited by examiner

DIGITALLY CONTROLLED LOW DROPOUT REGULATOR

CROSS REFERENCE TO RELATED APPLICATIONS

This application is a U.S. National Phase of International Patent Application No. PCT/JP2020/011332 filed on Mar. 16, 2020, which claims priority benefit of Japanese Patent Application No. JP 2019-108411 filed in the Japan Patent Office on Jun. 11, 2019. Each of the above-referenced applications is hereby incorporated herein by reference in its entirety.

TECHNICAL FIELD

The present technology relates to a digitally controlled low dropout regulator.

BACKGROUND ART

Today, a stabilization power source circuit (such as a linear regulator) that supplies a power source with a stable voltage using a voltage drop of a resistance or a semiconductor element is known as a type of regulator. A digitally controlled low dropout (LDO) regulator is known that is a linear regulator, from among stabilization power source circuits, that is digitally controlled and operates even with a low potential difference between input and output.

Here, for example, an integrated circuit is disclosed that is related to a voltage regulator that includes a control logic that controls a variable impedance element such that an output voltage is provided in response to an activity adjustment signal from a digital circuit (refer to Patent Literature 1). Further, a method for low-dropout regulation is disclosed, the method including enabling a digital-to-analog converter in response to an advance notification signal indicating that a change in load requiring increased current is to begin in a predetermined period (refer to Patent Literature 2).

CITATION LIST

Patent Literature

Patent Literature 1: Japanese Unexamined Patent Application Publication No. 2016-519356
Patent Literature 2: Japanese Unexamined Patent Application Publication No. 2016-511485

DISCLOSURE OF INVENTION

Technical Problem

Here, an auto-zero processing period for performing auto-zero processing is necessary for an AD converter by which the auto-zero processing is to be performed. Further, during the auto-zero processing period, processing of accumulating voltage information is performed by a comparator included in the AD converter. Thus, during the auto-zero processing period, the AD converter is in a dead-band state in which it is difficult to respond to a change in output voltage. This results in the AD converter being unable to control the output voltage.

The present technology has been made in view of the circumstances described above, and it is a primary object of the present technology to provide a digitally controlled LDO regulator that can control an output voltage even during an auto-zero processing period.

Solution to Problem

The inventors have conducted intensive researches in order to achieve the object described above. Consequently, the inventors have been successful in controlling an output voltage even during an auto-zero processing period, and have completed the present technology.

In other words, the present technology provides a digitally controlled low dropout regulator that includes
a plurality of AD converters, and
an impedance variable circuit, each of the plurality of AD converters including a comparator, in which
a first signal from each of the plurality of AD converters is input to the impedance variable circuit,
a plurality of the first signals is input to the impedance variable circuit, and a second signal output from the impedance variable circuit is input to one of two terminals of each of the plurality of AD converters,
when one of the plurality of AD converters is in operation, another of the plurality of AD converters performs auto-zero processing to set a voltage value used as a reference, and
the comparator included in each of the plurality of AD converters compares a voltage value of the second signal input to the one of the two terminals with the set voltage value.

In the digitally controlled low dropout regulator according to the present technology, each of the plurality of AD converters may be an AD converter by which the auto-zero processing is to be performed.

In the digitally controlled low dropout regulator according to the present technology, a control circuit may be further included, the control circuit may include a pulse generating circuit, and the pulse generating circuit may generate a pulse used to perform the auto-zero processing.

In the digitally controlled low dropout regulator according to the present technology, the pulse generating circuit may include a delay element and a computation element, the delay element may delay a timing of an input clock signal, and the computation element may perform computation with respect to the delayed clock signal and a non-delayed clock signal to generate a pulse.

In the digitally controlled low dropout regulator according to the present technology, a control circuit may be further included, and when the other of the plurality of AD converters is not performing the auto-zero processing, the control circuit may stop the other of the plurality of AD converters.

In the digitally controlled low dropout regulator according to the present technology, an inverter and a stop switch may be further included; output of the inverter may be connected to a gate of the stop switch; and, in order to stop the other of the plurality of AD converters, a gate potential of the stop switch may be fixed at a potential at which the stop switch is turned off, and the comparator included in the other of the plurality of AD converters may be stopped.

In the digitally controlled low dropout regulator according to the present technology, the impedance variable circuit may include a plurality of impedance elements, the respective first signals from the plurality of AD converters may be input to each of the plurality of impedance elements, and ON-OFF switching may be performed with respect to each of the plurality of impedance elements according to values of the first signals.

The present technology makes it possible to provide a digitally controlled LDO regulator that can control an output voltage even during an auto-zero processing period. Note that effects provided by the present technology is not necessarily limited to the effects described above, and any of the effects described in the present technology may be provided.

MODE(S) FOR CARRYING OUT THE INVENTION

Favorable embodiments for carrying out the present technology will now be described below with reference to the drawings. Note that the embodiments described below are examples of representative embodiments of the present technology, and the scope of the present technology is not construed as being limited to the embodiments.

Note that the description is made in the following order.
1. Overview of Present Technology
2. First Embodiment (First Example of Digitally Controlled Low Dropout (LDO) Regulator)
3. Second Embodiment (Second Example of Digitally Controlled Low Dropout (LDO) Regulator)

1. Overview of Present Technology

In general, digitally controlled LDO regulators are classified into three types of regulators that are a time-driven low dropout (LDO) regulator, an event-driven low dropout (LDO) regulator, and a phase-comparison low dropout (LDO) regulator. Here, an event-driven digitally controlled low dropout (LDO) regulator is described with reference to FIGS. 11 to 16.

Figure 11:
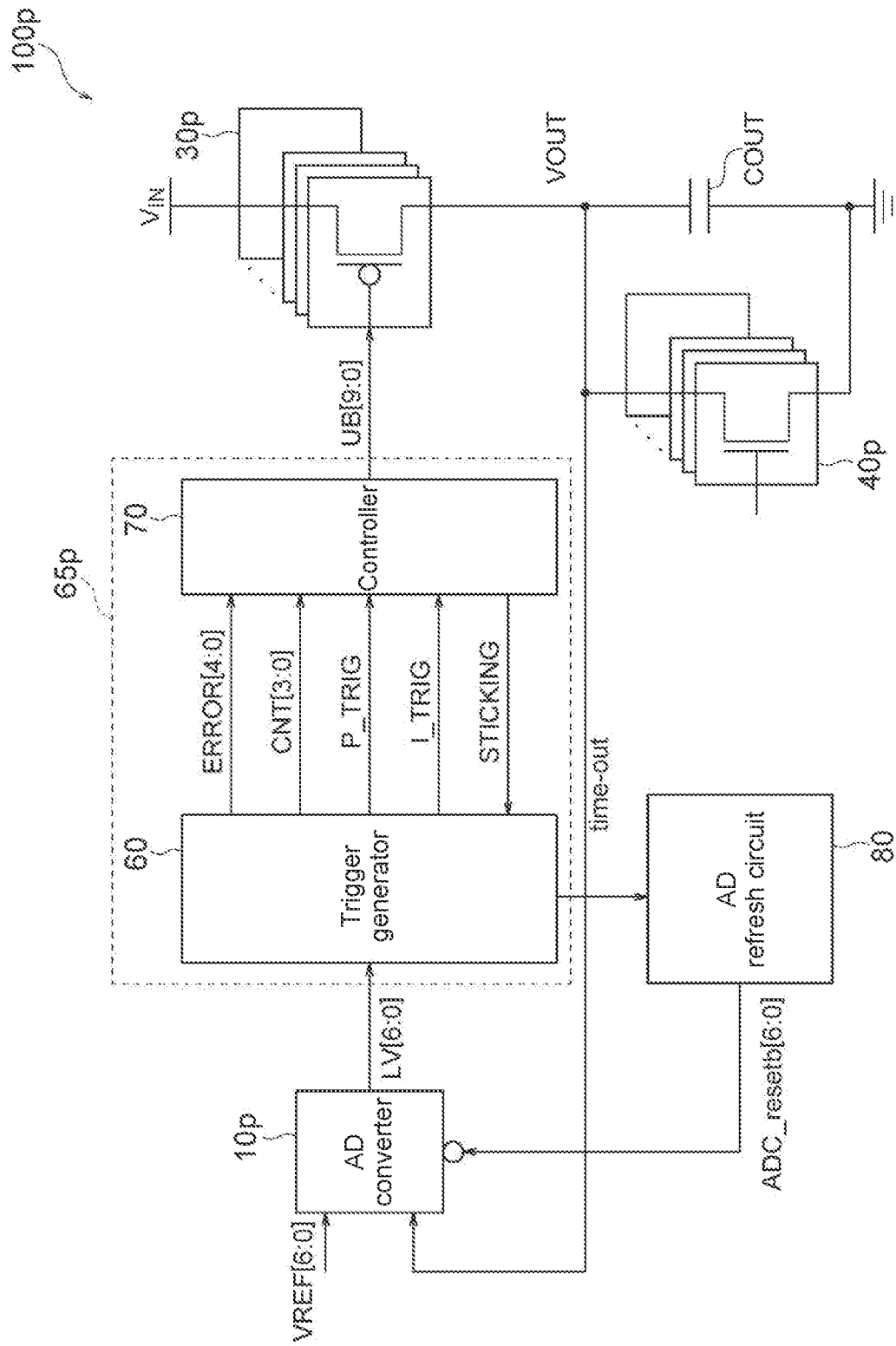
FIG. 11 is a block diagram illustrating a configuration of a conventional event-driven digitally controlled LDO regulator.

As illustrated in FIG. 11, an event-driven digitally controlled low dropout (LDO) regulator 100$p$ includes an AD converter 10$p$, a trigger generator 60, a controller 70, an impedance variable circuit 30$p$ (an output transistor), a voltage supply circuit 40$p$, and an AD refresh circuit 80. The trigger generator 60 and the controller 70 form a control circuit 65$p$. An output voltage VOUT from the impedance variable circuit 30$p$ is input to the voltage supply circuit 40$p$, and is also input to the AD converter 10$p$.

The AD refresh circuit 80 acquires, from the trigger generator 60, an auto-zero signal used to reset the AD converter 10$p$, and resets the AD converter 10$p$ when the AD refresh circuit 80 acquires an auto-zero signal.

The AD converter 10$p$ is a 7-bit AD converter. The AD converter 10$p$ monitors, at all times, an output voltage VOUT output from the impedance variable circuit 30, and an output code (LV[6:0]) of the AD converter 10$p$ is changed according to a change in the output voltage VOUT. With respect to the trigger generator 60 and the controller 70 serving as the control circuit 65, the trigger generator 60 operates using a change in the output code (LV[6:0]) of the AD converter 10$p$ as a trigger, and the controller 70 controls the impedance variable circuit 30$p$. This results in making the output voltage VOUT stable.

Here, in the case of a single-input configuration, or in order to reduce a mismatch between comparators, processing of accumulating voltage information is performed by a comparator included in the AD converter 10$p$.

Figure 12:
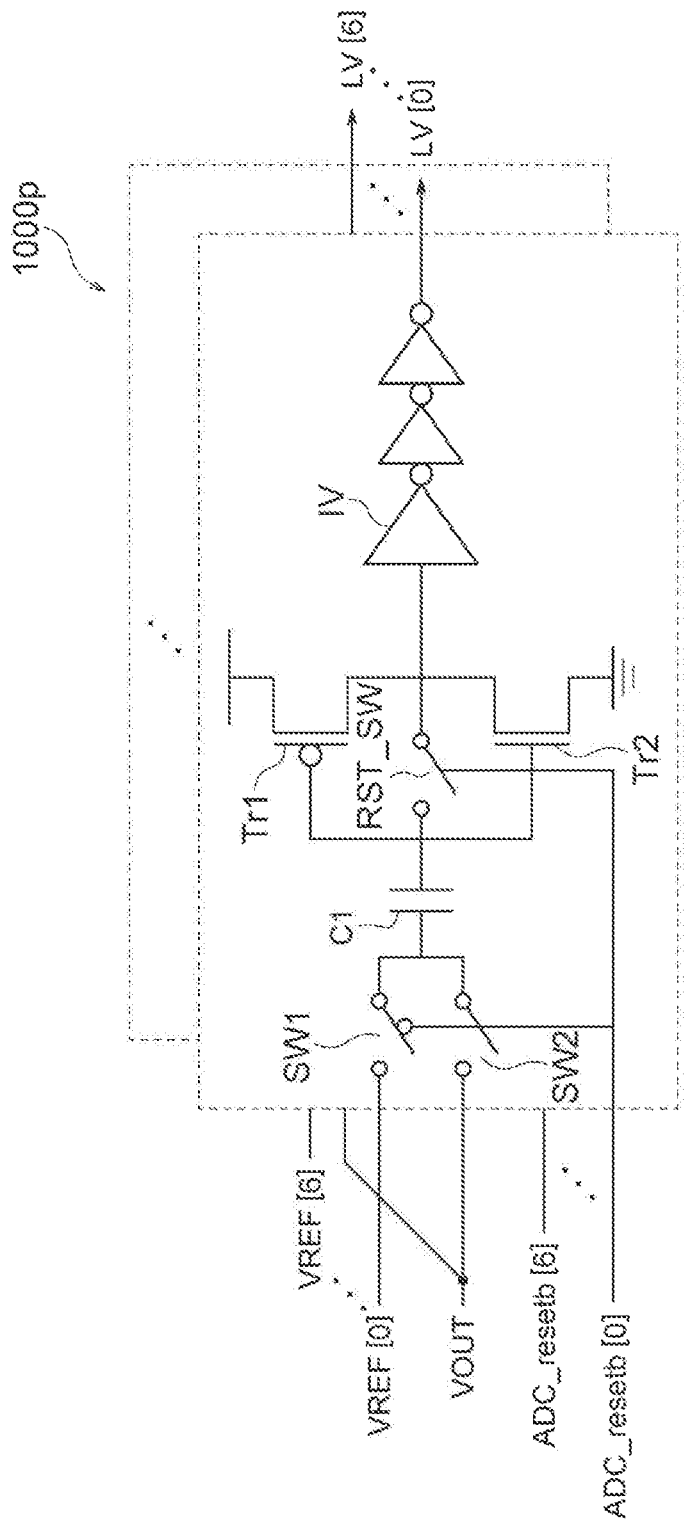
FIG. 12 is a block diagram of a comparator included in an AD converter.

FIG. 12 is a block diagram of a comparator 1000$p$ that is included in the AD converter 10$p$. The comparator 1000$p$ illustrated in FIG. 12 includes a switch SW1, a switch SW2, a capacitance C1, a transistor Tr1, a transistor Tr2, a reset switch RST_SW, and an inverter IV (three stages). In the case of the comparator 1000$p$ illustrated in FIG. 12, VREF [6:0] is compared with VOUT using seven comparators 1000$p$, and LV[6:0] is output. Note that ADC_resetb[6:0] is an auto-zero signal that is input by the AD refresh circuit 80.

Figure 13:
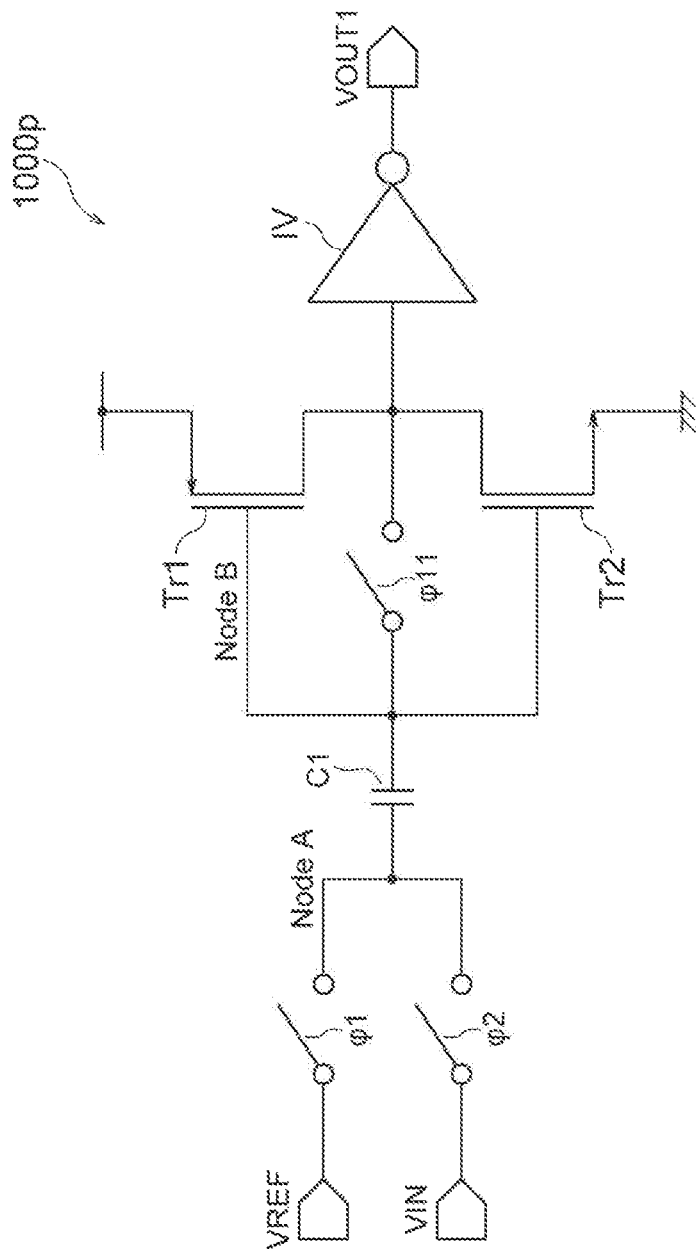
FIG. 13 is a block diagram of the simplified comparator.

Next, the comparator 1000$p$ is described with reference to FIGS. 13 and 14. FIG. 13 is a block diagram of the simplified comparator 1000$p$.

The comparator 1000$p$ illustrated in FIG. 13 includes a switch $\varphi1$, a switch $\varphi2$, the capacitance C1, the transistor Tr1, the transistor Tr2, a switch $\varphi11$, and the inverter IV. Further, the transistor Tr1 and the transistor Tr2 form an inverter. Note that components that are the same as each other are denoted by the same reference numeral, and the description is omitted as appropriate.

Figure 14:
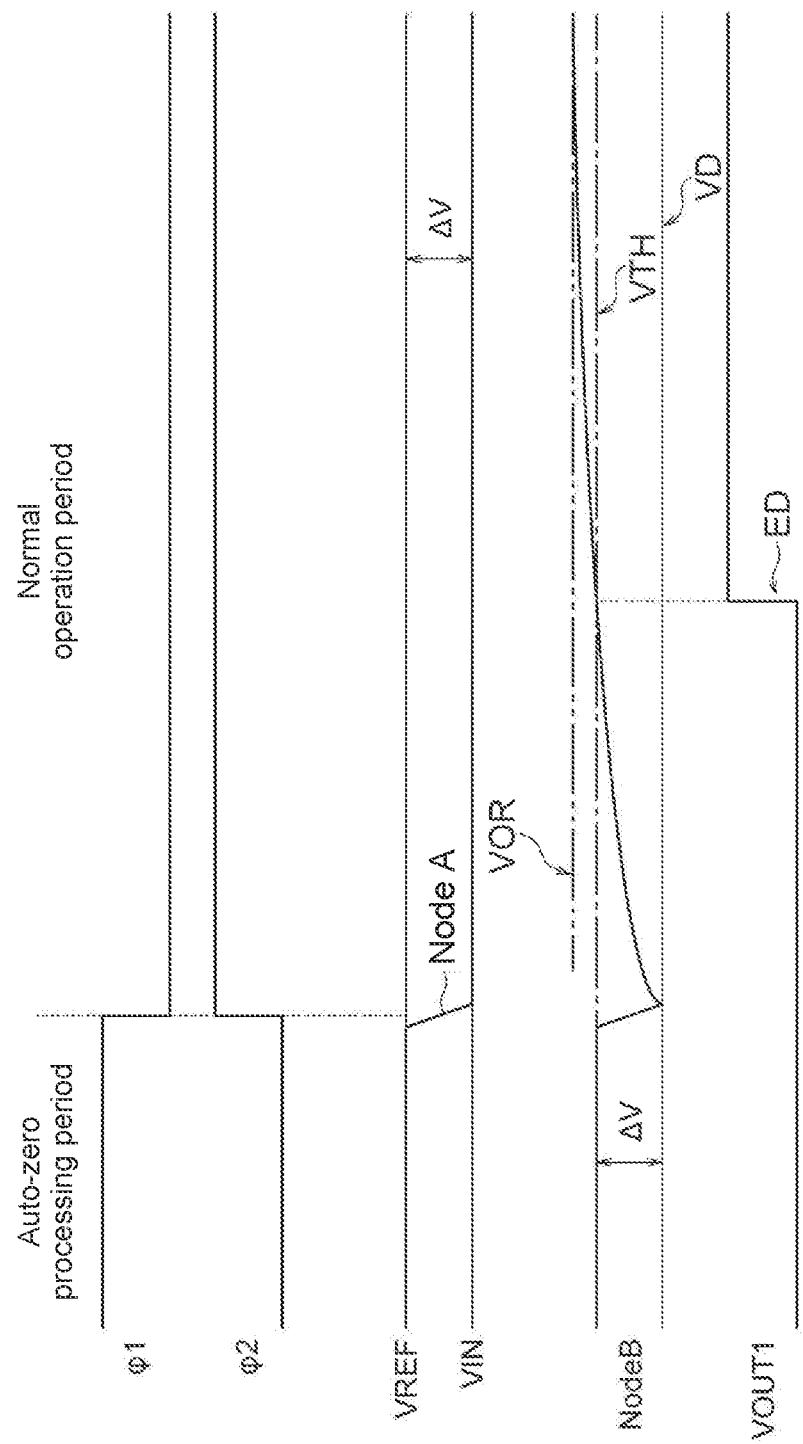
FIG. 14 is an explanatory diagram explaining that a false determination may be performed when the comparator does not perform processing of accumulating voltage information.

Further, FIG. 14 is an explanatory diagram explaining that a false determination may be performed when the comparator 1000p does not perform the processing of accumulating voltage information.

In the comparator 1000p, first, the switch φ1 and the switch φ11 are closed to be turned on, and a difference voltage (VREF-VTH) of a difference between a reference voltage VREF and a threshold voltage VTH of the inverter is stored in the capacitance C1. Next, the switch φ1 and the switch φ11 are opened, and the switch φ2 is closed. When the switch φ2 is closed, a node B enters a high-impedance state, and the potential decreases by a difference voltage Δ V of a difference between the reference voltage VREF and VIN. Then, the comparator 1000p compares VIN with the reference voltage VREF.

Here, as illustrated in FIG. 14, the comparator 1000p may perform a false determination by accumulated voltage information being changed due to, for example, a change in the setting of a reference voltage, a change in temperature, an effect of variation in power supply voltage, or an effect of a leakage current. For example, there is an increase in voltage in the node B due to gate leakage. In this case, a false determination ED will be performed in an output voltage VOUT1 if the increased voltage in the node B exceeds the threshold VTH of the inverter.

Note that a voltage VOR represents a voltage value to which the gate-leakage voltage is matched, and a voltage VD represents a desired voltage value.

In order to avoid such a false determination ED, it is necessary that the capacitance C1 keep on holding correct voltage information used as a reference, and periodic auto-zero processing is to be performed by the AD converter 10p.

Here, during the auto-zero processing period, the AD converter 10p is in a dead-band state in which a desired voltage is not supplied to the voltage supply circuit 40p, since it is difficult for the AD converter 10p to respond to a change in the output voltage VOUT from the impedance variable circuit 30p.

Figure 15:
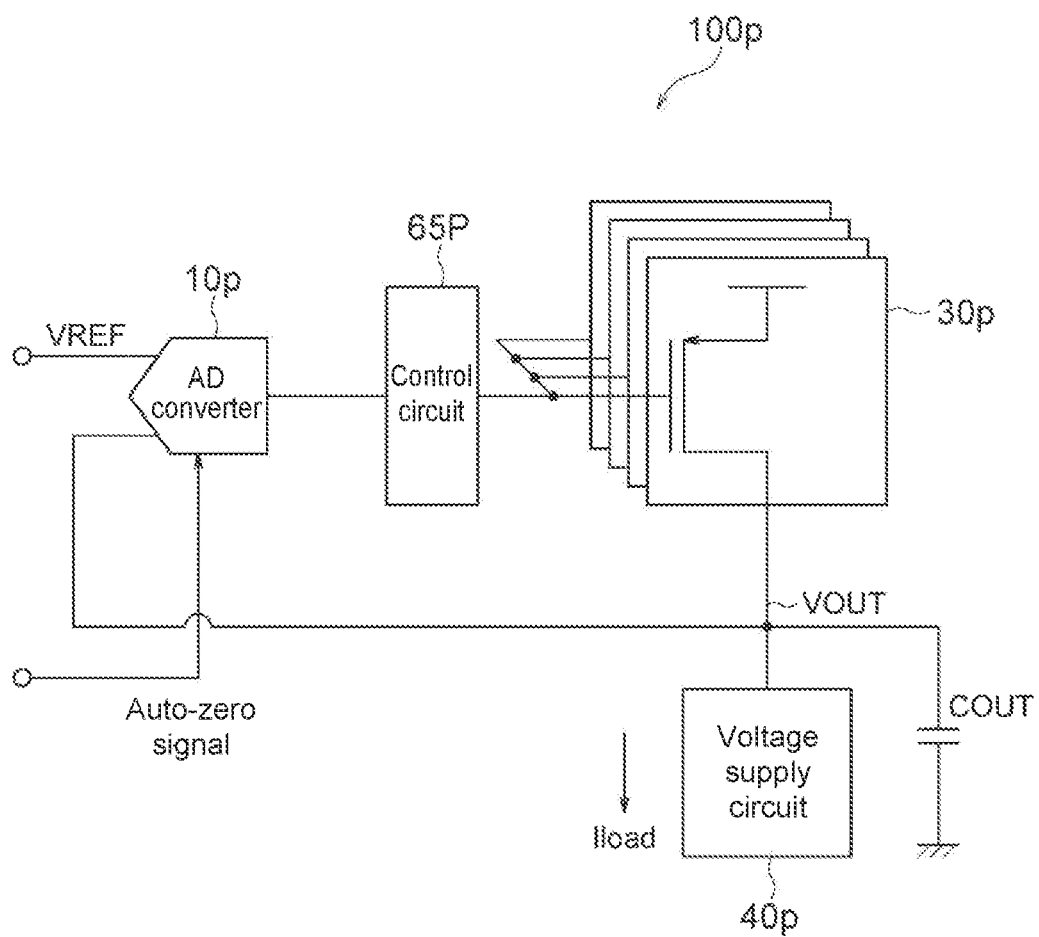
FIG. 15 is a simplified block diagram of the simplified block diagram of the conventional digitally controlled LDO regulator, which is in a dead-band state during an auto-zero processing period.

FIG. 15 is a block diagram of the digitally controlled low dropout (LDO) regulator 100p, which is in a dead-band state during an auto-zero processing period. FIG. 15 is a block diagram of the simplified event-driven digitally controlled low dropout (LDO) regulator 100p of FIG. 11. Note that a component that is the same as a component of FIG. 11 is denoted by the same reference numeral as the component of FIG. 11, and a description thereof is omitted as appropriate.

Figure 16:
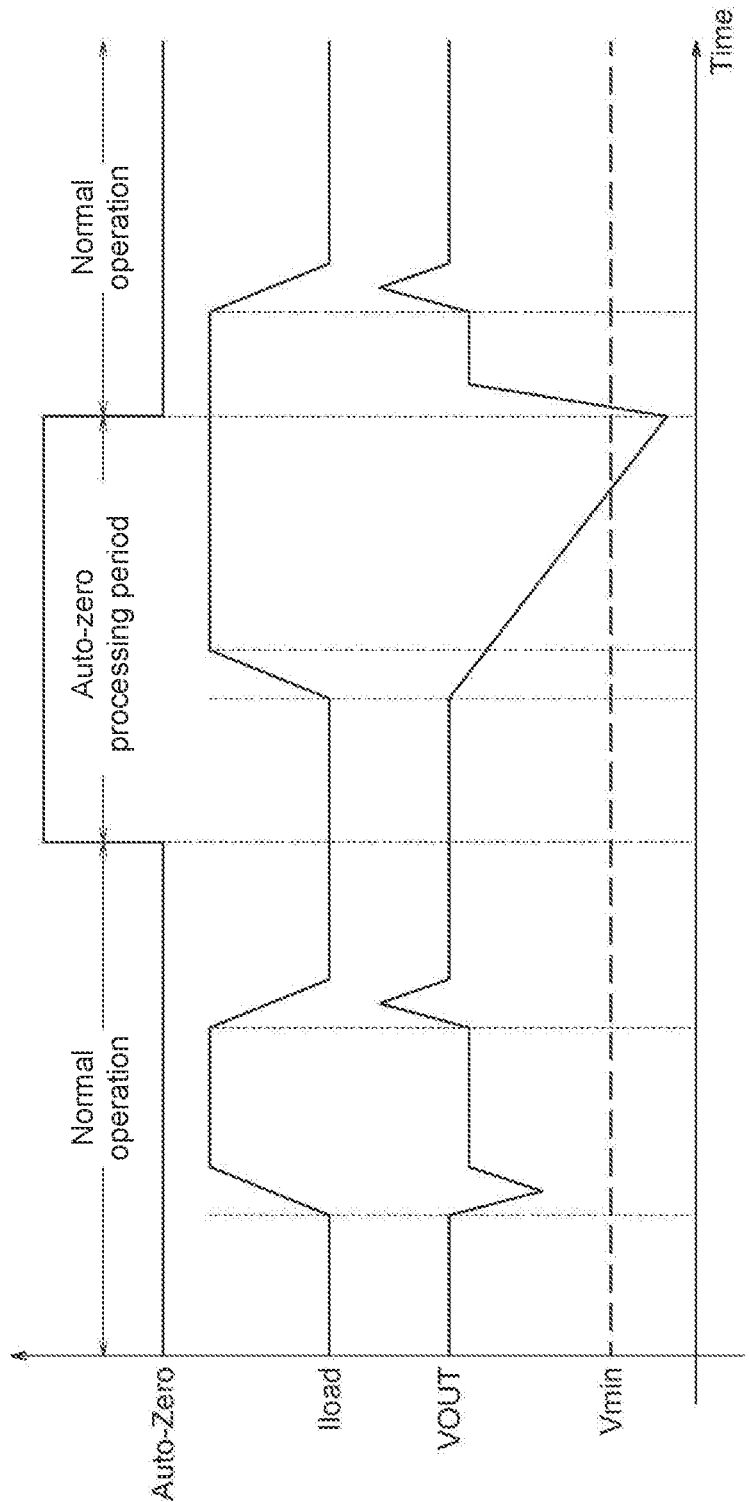
FIG. 16 an explanatory diagram explaining a state in which an output voltage is changed when a load current of a voltage supply circuit is changed during an auto-zero processing period.

Further, FIG. 16 illustrates a state in which the output voltage VOUT is changed when a load current Iload of the voltage supply circuit 40p is changed during an auto-zero processing period. FIG. 16 is an explanatory diagram explaining that the output voltage VOUT is changed when the load current Iload of the voltage supply circuit 40p is changed during an auto-zero processing period.

In the explanatory diagram of FIG. 16, the output voltage VOUT corresponding to an output value is greatly changed when the load current Iload is changed during an auto-zero processing period of the digitally controlled low dropout (LDO) regulator 100p.

The present technology has been made in view of the circumstances described above, and it is a primary object of the present technology to provide a digitally controlled low dropout (LDO) regulator that can control the output voltage VOUT even during an auto-zero processing period.

The auto-zero processing has been described above using the event-driven digitally controlled low dropout (LDO) regulator 100p. However, the present technology is not limited to an event-driven digitally controlled low dropout (LDO) regulator.

2. First Embodiment (First Example of Digitally Controlled Low Dropout (LDO) Regulator)

A digitally controlled low dropout (LDO) regulator of a first embodiment according to the present technology is a digitally controlled low dropout (LDO) regulator that includes a plurality of AD converters and an impedance variable circuit, each of the plurality of AD converters including a comparator, in which a first signal from each of the plurality of AD converters is input to the impedance variable circuit; a plurality of the first signals is input to the impedance variable circuit, and a second signal output from the impedance variable circuit is input to one of two terminals of each of the plurality of AD converters; when one of the plurality of AD converters is in operation, another of the plurality of AD converters performs auto-zero processing to set a voltage value used as a reference; and the comparator included in each of the plurality of AD converters compares a voltage value of the second signal input to the one of the two terminals with the set voltage value.

The digitally controlled low dropout (LDO) regulator of the first embodiment according to the present technology makes it possible to control an output voltage even during an auto-zero processing period.

Note that, when two AD converters are used, the two AD converters perform auto-zero processing alternately, and when three or more ADC converters are used, only one of the AD converters is in operation, and another of the AD converters performs auto-zero processing. Here, the other of the AD converters refers to an AD converter other than the AD converter in operation. Further, a state in which two AD converters operate alternately refers to an interleaved operation. Note that an example in which two ADC converters are used is described below.

Figure 1:
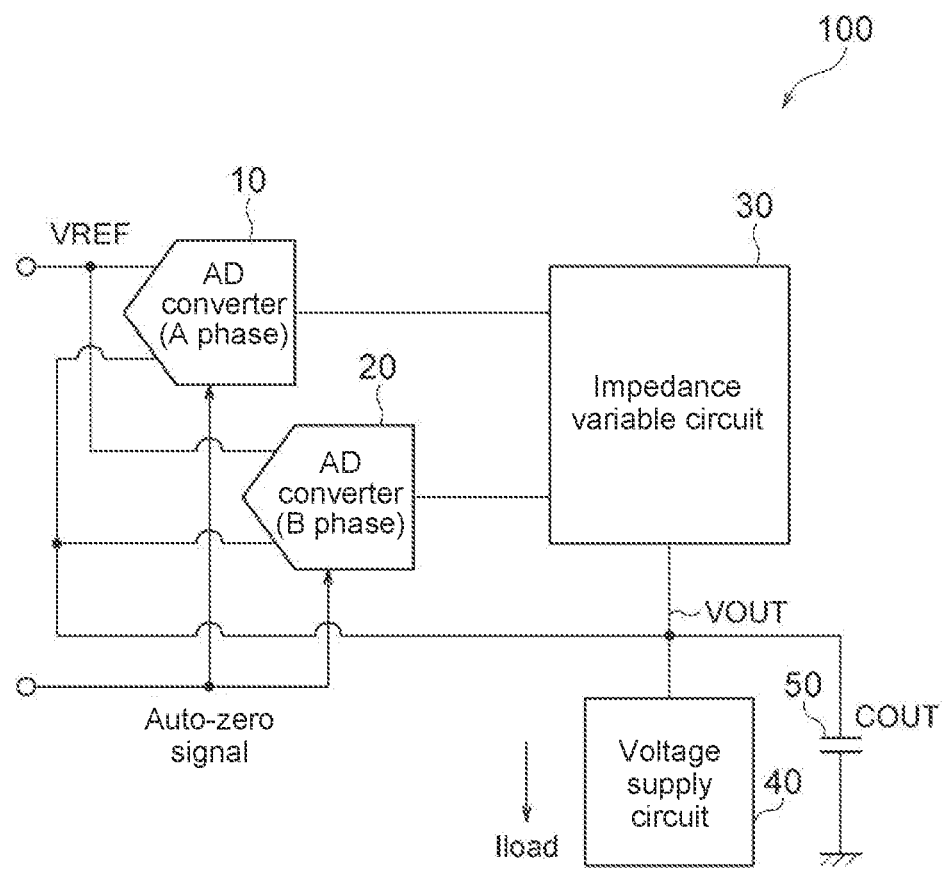
FIG. 1 is a block diagram illustrating an example of a configuration of a digitally controlled low dropout (LDO) regulator of a first embodiment according to the present technology.

FIG. 1 illustrates an example of the digitally controlled low dropout (LDO) regulator of the first embodiment according to the present technology. FIG. 1 is a block diagram illustrating an example of a configuration of a digitally controlled low dropout (LDO) regulator 100 of the first embodiment according to the present technology.

As illustrated in FIG. 1, the digitally controlled low dropout (LDO) regulator 100 of the first embodiment according to the present technology includes a plurality of AD converters (an AD converter (A phase) 10 and an AD converter (B phase) 20), an impedance variable circuit 30, a voltage supply circuit 40, and a capacitance 50.

Each of the AD converter (A phase) 10 and the AD converter (B phase) 20 includes a comparator. Note that the digitally controlled low dropout (LDO) regulator 100 according to the first embodiment includes two AD converters that are the AD converter (A phase) 10 and the AD converter (B phase) 20, but the number of AD converters is not limited to two.

Further, each of the AD converter (A phase) 10 and the AD converter (B phase) 20 is an AD converter by which auto-zero processing is to be performed.

Figure 2:
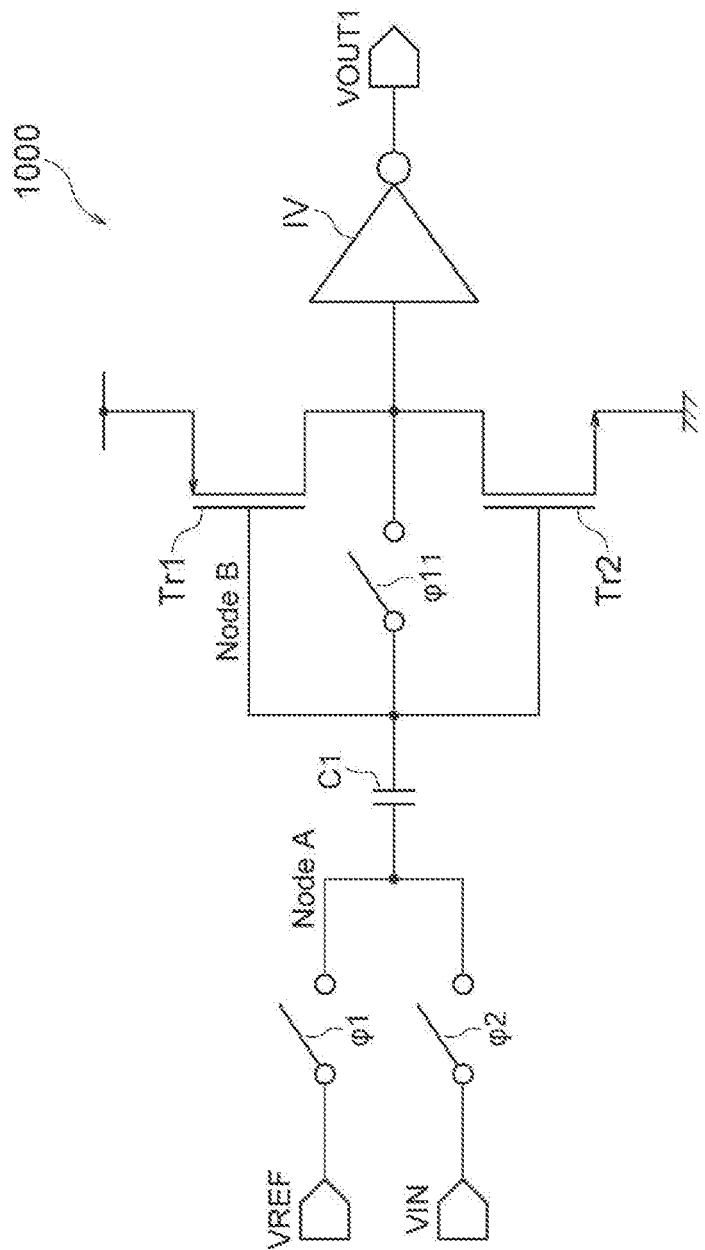
FIG. 2 is a block diagram illustrating a configuration of a comparator that is included in an AD converter (A phase).

FIG. 2 illustrates a comparator 1000 that is included in the AD converter (A phase) 10. FIG. 2 is a block diagram illustrating a configuration of the comparator 1000 included in the AD converter (A phase) 10. Further, the comparator included in the AD converter (B phase) 20 has the same configuration as the comparator 1000. Note that the comparators of the AD converter (A phase) 10 and the AD converter (B phase) 20 are not limited to having the same configuration. Further, the comparator 1000 illustrated in FIG. 2 is merely an example, and the configuration of the comparator is not limited to the configuration of the comparator illustrated in FIG. 2.

The comparator 1000 illustrated in FIG. 2 includes a switch φ1, a switch φ2, a capacitance C1, a transistor Tr1, a transistor Tr2, a switch φ11, and an inverter IV. Further, the transistor Tr1 and the transistor Tr2 form an inverter.

Returning to FIG. 1, a first signal of each of the AD converter (A phase) 10 and the AD converter (B phase) 20 is input to the impedance variable circuit 30. Further, a plurality of first signals (the respective first signals of the AD converter (A phase) 10 and the AD converter (B phase) 20) is input to the impedance variable circuit 30, and a second signal output from the impedance variable circuit 30 is input to one of two terminals of each of the AD converter (A phase) 10 and the AD converter (B phase) 20.

Furthermore, when one of the plurality of AD converters (the AD converter (A phase) 10 and the AD converter (B phase) 20) is in operation, another of the plurality of AD converters (an AD converter other than one of the AD converters in operation) performs auto-zero processing to set a voltage value (voltage information) used as a reference, and the comparator 1000 included in each of the plurality of AD converters (the AD converter (A phase) 10 and the AD converter (B phase) 20) compares a voltage value of the second signal input to the one of the two terminals with the set voltage value.

Next, operations of the respective comparators 1000 of the AD converter (A phase) 10 and the AD converter (B phase) 20 are described with reference to the configuration of the comparator 1000 of FIG. 2.

In the comparator 1000, first, the switch φ1 and the switch φ11 are closed to be turned on, and a difference voltage (VREF-VTH) of a difference between a reference voltage VREF and a threshold voltage VTH of the inverter is stored in the capacitance C1. Next, the switch φ1 and the switch φ11 are opened, and the switch φ2 is closed. When the switch φ2 is closed, a node B enters a high-impedance state, and the potential decreases by a difference voltage Δ V of a difference between the reference voltage VREF and VIN. Then, the comparator 1000 compares the voltage value (VIN) of the second signal to the reference voltage VREF.

Figure 3:
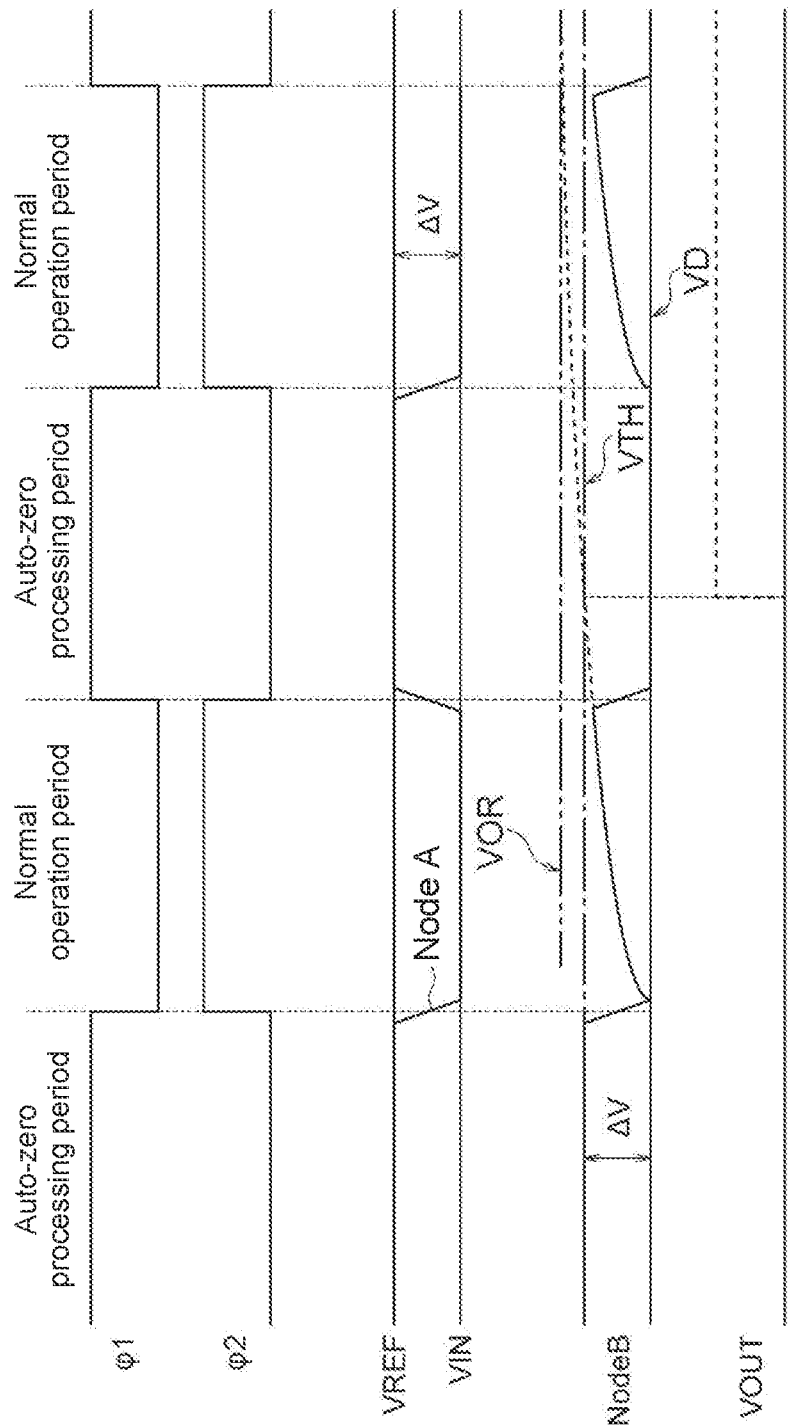
FIG. 3 is an explanatory diagram explaining that a false determination of the comparator is prevented by an auto-zero processing period and a normal operation period being repeatedly alternated.

FIG. 3 illustrates a state in which each of the AD converter (A phase) 10 and the AD converter (B phase) 20 repeatedly alternately experiences an auto-zero processing period for which auto-zero processing is performed, and a normal operation period. FIG. 3 is an explanatory diagram explaining that a false determination of the comparator is prevented by an auto-zero processing period and a normal operation period being repeatedly alternated.

During the normal operation period indicating a state of a normal operation, the reference voltage VREF stored in the capacitance C1 is compared to a voltage value of a second signal that is input to VIN, and a result of the comparison is inverted by the inverter IV to be output from VOUT1 as a first signal (refer to FIG. 2). In this case, the normal operation is switched to auto-zero processing in an alternate manner before the voltage exceeds the threshold VTH of the inverter in each of the AD converter (A phase) 10 and the AD converter (B phase) 20, and this prevents the comparator from performing a false determination.

Note that a voltage VOR represents a voltage value to which the gate-leakage voltage is matched, and a voltage VD represents a desired voltage value.

Figure 4:
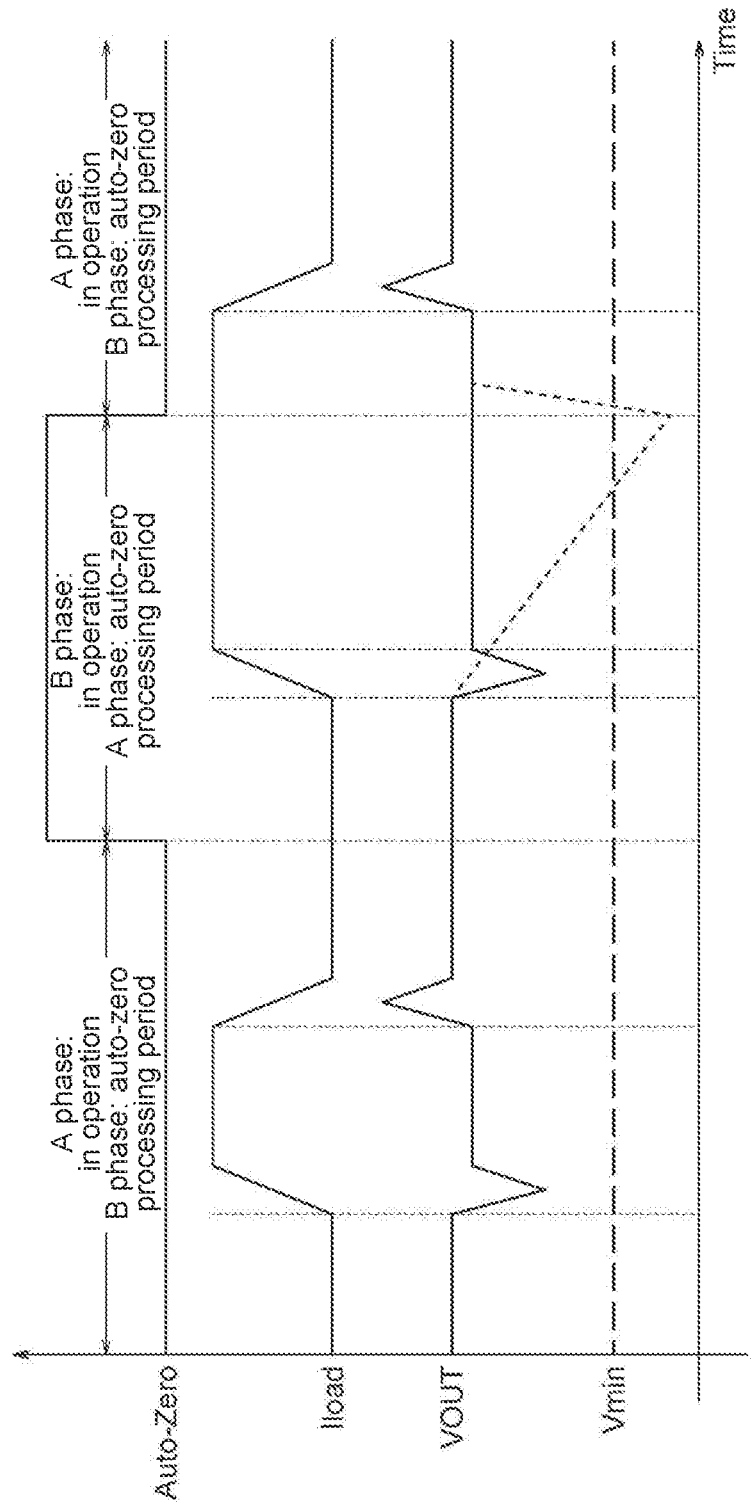
FIG. 4 is an explanatory diagram explaining that the voltage value of a second signal (an output voltage) output from an impedance variable circuit of the digitally controlled low dropout (LDO) regulator according to the first embodiment is not made smaller.

FIG. 4 illustrates a state in which the voltage value of a second signal (the output voltage VOUT) output from the impedance variable circuit 30 of the digitally controlled low dropout (LDO) regulator 100 according to the first embodiment is not made smaller.

In the digitally controlled low dropout (LDO) regulator 100 of the first embodiment, auto-zero processing is performed alternately by two AD converters that are the AD converter (A phase) 10 and the AD converter (B phase) 20, as illustrated in FIG. 4. Accordingly, in the digitally controlled low dropout (LDO) regulator 100 of the first embodiment, one of the AD converter (A phase) 10 and the AD converter (B phase) 20 can operate even during an auto-zero processing period of another of the AD converter (A phase) 10 and the AD converter (B phase) 20.

Consequently, the digitally controlled low dropout (LDO) regulator 100 of the first embodiment can respond to a change in a second signal (the output voltage VOUT) from the impedance variable circuit 30, and a control of the supply of voltage to the voltage supply circuit 40 is not stopped. Further, the dead-band state of the digitally controlled low dropout (LDO) regulator 100 can be eliminated by auto-zero processing being performed alternately by two AD converters that are the AD converter (A phase) 10 and the AD converter (B phase) 20. Since the dead-band state of the digitally controlled low dropout (LDO) regulator 100 can be eliminated, a change in the load current Iload flowing through the voltage supply circuit 40 is allowed even when one of the AD converters (the AD converter (A phase) 10 and the AD converter (B phase) 20) is in a state during an auto-zero processing period. This results in there being no need for, for example, an activity adjustment signal or an advance notification signal that is conventionally used, the control circuit 65p, and the ADC refresh circuit 80.

Thus, the digitally controlled low dropout (LDO) regulator 100 can be easily applied to, for example, an adaptive voltage control system. In other words, the digitally controlled low dropout (LDO) regulator 100 of the first embodiment can be easily applied to other systems such as an adaptive voltage control system since there is no particular use limitation.

Further, an auto-zero signal used to cause auto-zero processing to be performed alternately by the AD converter (A phase) 10 and the AD converter (B phase) 20 can be generated independently of the load current Iload. Thus, a simple configuration can be achieved. Further, the AD converter (A phase) 10 and the AD converter (B phase) 20 each periodically enter an auto-zero state, as illustrated in FIG. 4. This makes it possible to prevent a false determination from being performed due to an effect of a leakage current, a change in the reference voltage VREF, or a change in temperature.

As described above, the digitally controlled low dropout (LDO) regulator 100 of the first embodiment according to the present technology includes a plurality of AD converters (the AD converter (A phase) 10 and the AD converter (B phase) 20), and the impedance variable circuit 30. With respect to the AD converter (A phase) 10 and the AD converter (B phase) 20, when one of the AD converters (for example, the AD converter (A phase) 10) is in operation, another of the AD converters (for example, the AD converter (B phase) 20) performs auto-zero processing to set a voltage value (voltage information) used as a reference. The plurality of AD converters (the AD converter (A phase) 10 and the AD converter (B phase) 20) operates alternately.

Consequently, the digitally controlled low dropout (LDO) regulator 100 of the first embodiment can respond to a change in a second signal (the output voltage VOUT) from the impedance variable circuit 30 even during an auto-zero processing period, and thus the output voltage VOUT from the impedance variable circuit 30 can be controlled.

In the digitally controlled low dropout (LDO) regulator 100 according to the first embodiment, the AD converter (A phase) 10 and the AD converter (B phase) 20 perform auto-zero processing to set a reference voltage value (voltage information) in an alternate manner. However, the configuration is not limited thereto. For example, auto-zero processing may be performed by one of the AD converter (A phase) 10 and the AD converter (B phase) 20 when a leakage current that exhibits a current value equal to or greater than a specified current value flows.

Further, the impedance variable circuit 30 of the digitally controlled low dropout (LDO) regulator 100 according to the first embodiment may include a plurality of impedance elements. In this case, the impedance variable circuit 30 includes a plurality of switches, and the number of impedance elements driven can be changed according to the load current Iload. Specifically, respective first signals from the plurality of AD converters (the AD converter (A phase) 10 and the AD converter (B phase) 20) are input to each of the plurality of impedance elements, and this makes it possible to perform ON-OFF switching with respect to each of the plurality of impedance elements according to the values of the first signals.

3. Second Embodiment (Second Example of Digitally Controlled Low Dropout (LDO) Regulator)

A digitally controlled low dropout (LDO) regulator of a second embodiment according to the present technology is the digitally controlled low dropout (LDO) regulator according to the first embodiment further including a control circuit, the control circuit including a pulse generating circuit, the pulse generating circuit generating a pulse used to perform auto-zero processing.

In this case, the pulse generating circuit of the digitally controlled low dropout (LDO) regulator of the second embodiment includes a delay element and a computation element, the delay element delaying a timing of an input clock signal, the computation element performing computation with respect to the delayed clock signal and a non-delayed clock signal to generate a pulse.

The digitally controlled low dropout (LDO) regulator of the second embodiment of the present technology makes it possible to eliminate a period of a dead-band state, and to further shorten an auto-zero processing period. Note that the digitally controlled low dropout (LDO) regulator of the second embodiment may be applied to the digitally controlled low dropout (LDO) regulator 100 of the first embodiment.

The digitally controlled low dropout (LDO) regulator of the second embodiment according to the present technology further includes a control circuit, in which, when another of a plurality of AD converters (an AD converter other than one of the plurality of AD converters that is in operation) is not performing auto-zero processing, the control circuit stops the other of the plurality of AD converters, which is not operating as an AD converter (that is, the AD converter other than the one of the plurality of AD converters that is in operation).

In this case, the digitally controlled low dropout (LDO) regulator of the second embodiment further includes an inverter and a stop switch, in which output of the inverter is connected to a gate of the stop switch, and, in order to stop the AD converter being from among the plurality of AD converters and not being operating as an AD converter, a gate potential of the stop switch is fixed at a potential at which the stop switch is turned off, and the comparator included in the AD converter being from among the plurality of AD converters and not being operating as an AD converter is stopped.

The digitally controlled low dropout (LDO) regulator of the second embodiment according to the present technology makes it possible to stop current flowing through the comparator included in the AD converter not being performing auto-zero processing, and this results in being able to reduce power consumption in the digitally controlled low dropout (LDO) regulator. Note that the digitally controlled low dropout (LDO) regulator of the second embodiment may be applied to the digitally controlled low dropout (LDO) regulator 100 of the first embodiment.

Figure 5:
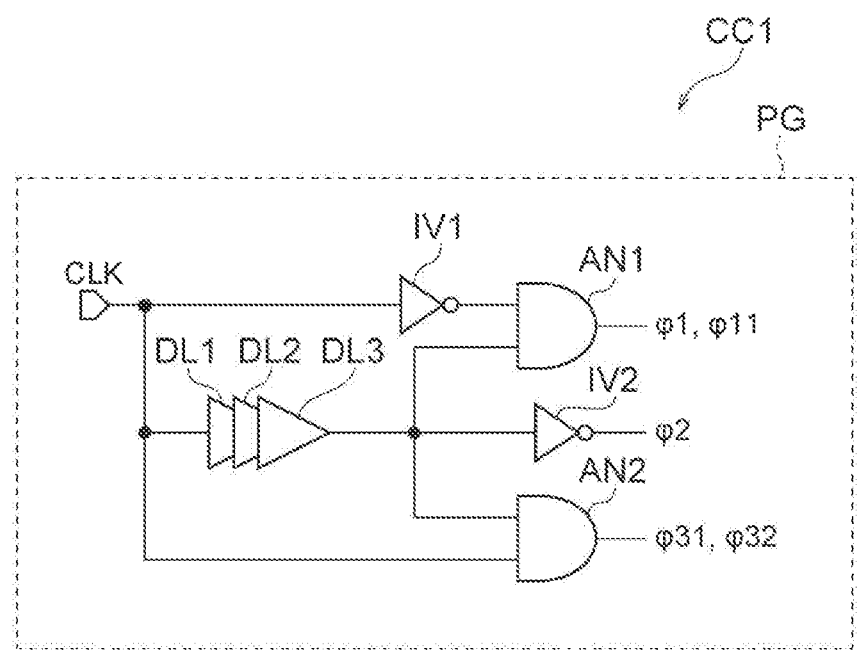
FIG. 5 is a block diagram illustrating a pulse generating circuit of a control circuit included in a digitally controlled low dropout (LDO) regulator of a second embodiment according to the present technology.

A pulse generating circuit PG of a control circuit CC1 included in the digitally controlled low dropout (LDO) regulator of the second embodiment according to the present technology is described with reference to FIG. 5. FIG. 5 is a block diagram illustrating the pulse generating circuit PG of the control circuit CC1 included in the digitally controlled low dropout (LDO) regulator of the second embodiment according to the present technology.

The digitally controlled low dropout (LDO) regulator of the second embodiment according to the present technology is a digitally controlled low dropout (LDO) regulator further including the control circuit CC1, the control circuit CC1 including the pulse generating circuit PG, the pulse generating circuit PG generating a pulse used to perform auto-zero processing.

The control circuit CC1 includes the pulse generating circuit PG, and the pulse generating circuit PG includes a delay element (a delay element DL1, a delay element DL2, a delay element DL3) and a computation element (a computation element AN1, a computation element AN2), the delay element DL delaying a timing of an input clock signal, the computation element performing computation with respect to the delayed clock signal and a non-delayed clock signal to generate a pulse.

As illustrated in FIG. 5, the pulse generating circuit PG includes, for example, the delay elements (the delay element DL1, the delay element DL2, and the delay element DL3), inverting elements (an inverter IV1 and an inverter IV2), and the computation elements (the computation element AN1 and the computation element AN2).

A clock CLK is input to the pulse generating circuit PG, and the input clock CLK is divided into three. The first clock CLK obtained by the division into three is input to the inverter IV1. The second clock CLK obtained by the division into three is input to the delay element DL1, where the delay element DL1, the delay element DL2, and the delay element DL3 are connected in series. The third clock CLK obtained by the division into three is input to the computation element AN2. Output of the inverter IV1 and output of the delay element DL3 are input to the computation element AN1 to generate a pulse (signal) (a switch φ1, a switch φ11). Further, the output of the delay element DL3 is also connected to the inverter IV2 to generate a signal of a timing of a normal operation period (a switch (φ2). Furthermore, the output of the delay element DL3 and the clock CLK are input to the computation element AN2 to generate a signal of a timing of stopping a current of the comparator (a switch φ31, a switch (φ32). As described above, the pulse generating circuit PG performs control ON-OFF switching performed with respect to the respective switches (the switch φ1, the switch φ11, the switch φ2, the switch (φ31, and the switch φ32), using the generated timing signals.

Figure 6:
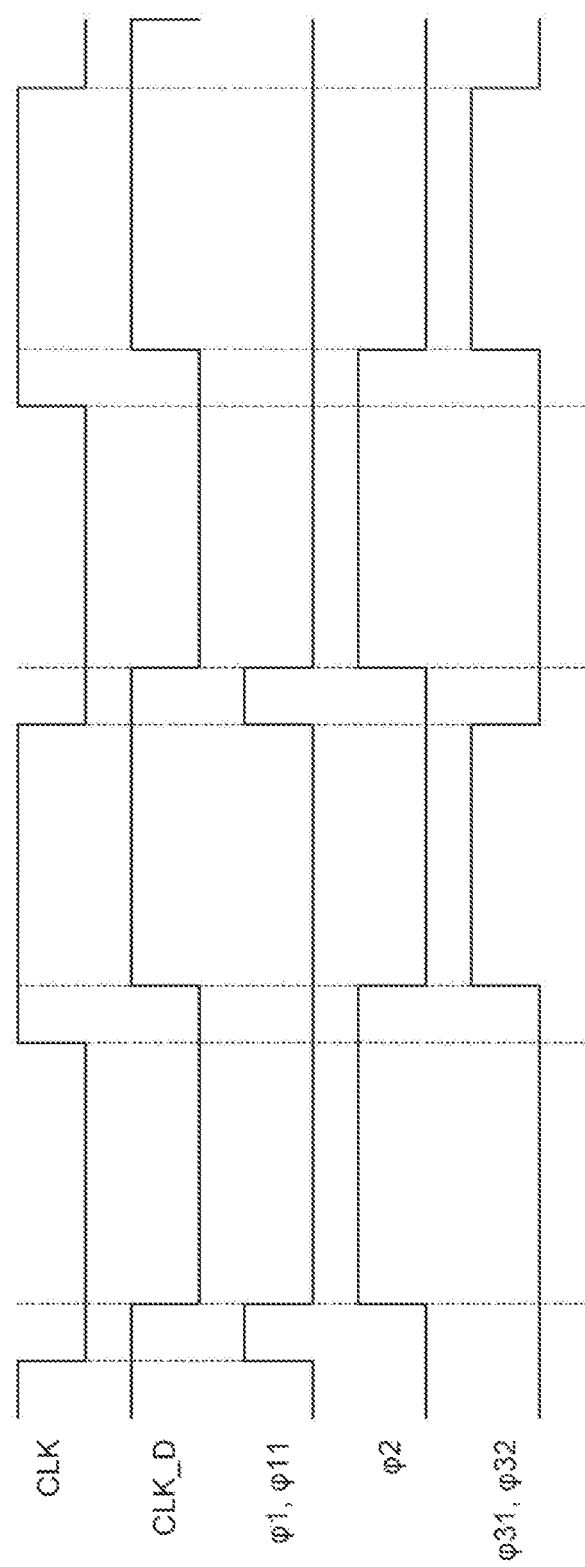
FIG. 6 is a timing chart illustrating a timing of a signal generated by a pulse generating circuit.

FIG. 6 illustrates a timing of a signal generated by the pulse generating circuit PG. FIG. 6 is a timing chart illustrating a timing of a signal generated by the pulse generating circuit PG.

As illustrated in FIG. 6, a clock CLK indicates a timing of an input clock CLK, and a clock CLK_D indicates a timing of a clock CLK_D output from the delay element DL3. Further, ON-OFF switching is performed with respect to the switch φ1 and the switch φ11 according to a pulse (signal) output from the computation element AN1. On-off switching is performed with respect to the switch φ2 according to a signal output from the inverter IV2. On-off switching is performed with respect to the switch φ01 and the switch φ32 according to a signal output from the computation element AN2.

Figure 7:
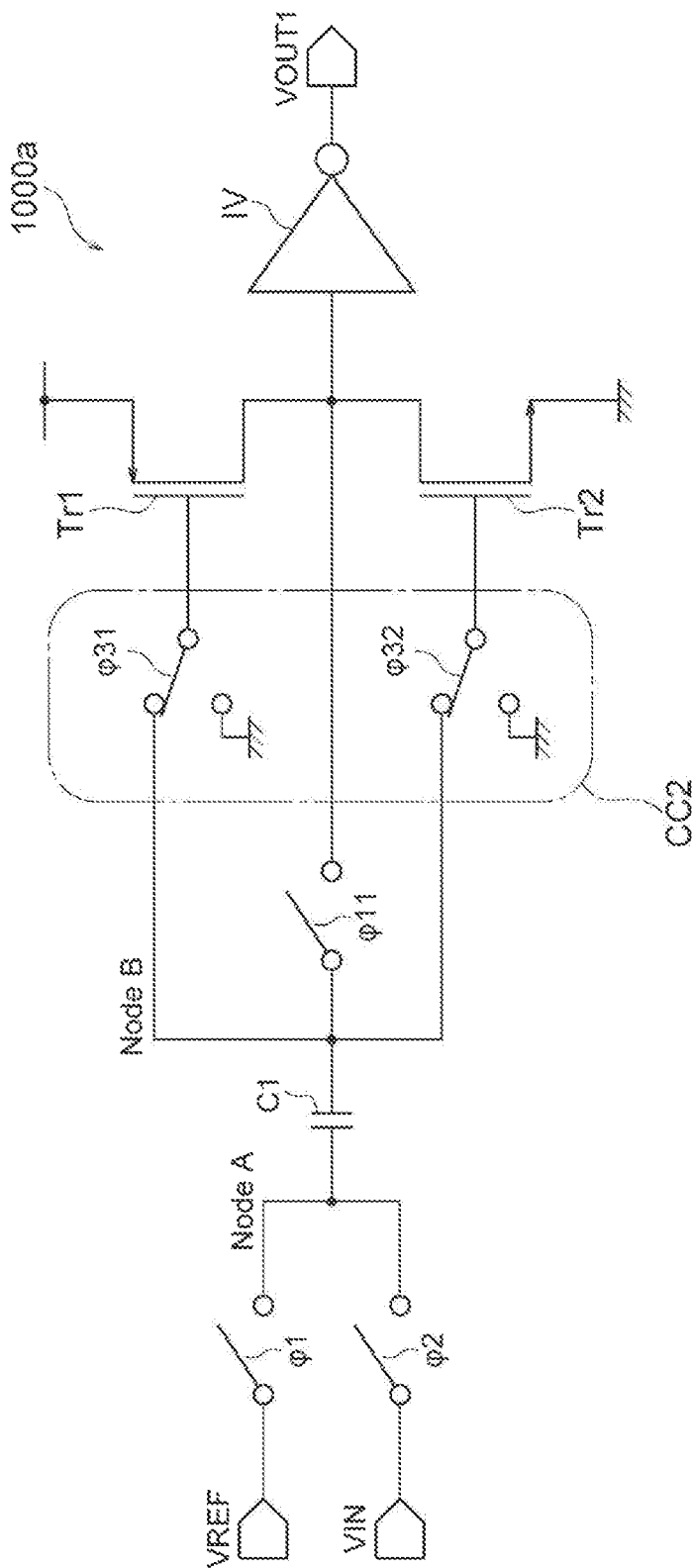
FIG. 7 is a block diagram illustrating a configuration of a comparator that includes a control circuit that stops the comparator.

Next, a control circuit CC2 that stops a comparator 1000*a* is described with reference to FIG. 7. FIG. 7 is a block diagram illustrating a configuration of the comparator 1000*a* including the control circuit CC2 stopping the comparator 1000*a*. The comparator 1000*a* of the second embodiment illustrated in FIG. 7 is different from the comparator 1000 of the first embodiment illustrated in FIG. 2 in including the control circuit CC2. A component that is the same as a component of the first embodiment is denoted by the same reference numeral as the component of the first embodiment, and a description thereof is omitted as appropriate.

The comparator 1000*a* according to the second embodiment further includes the control circuit CC2. The control circuit CC2 includes the switch φ31 and the switch φ32. On-off switching is performed with respect to the switch φ31 and the switch φ32 at a timing of a pulse (signal) generated by the control circuit CC1 (refer to FIG. 6). In this case, the control circuit CC2 may stop an AD converter, from among a plurality of AD converters, that is not performing auto-zero processing. For example, when an AD converter, from among a plurality of AD converters (the AD converter (A phase) 10 and the AD converter (B phase) 20), that is not operating as an AD converter is not performing auto-zero processing, the AD converter not being operating as an AD converter may be stopped.

Note that ON-OFF switching is also performed with respect to the switch φ1, the switch φ11, and the switch φ2 of the comparator 1000*a* according to the second embodiment at the timings of the signals generated by the control circuit CC1 (refer to FIG. 6).

Figure 8:
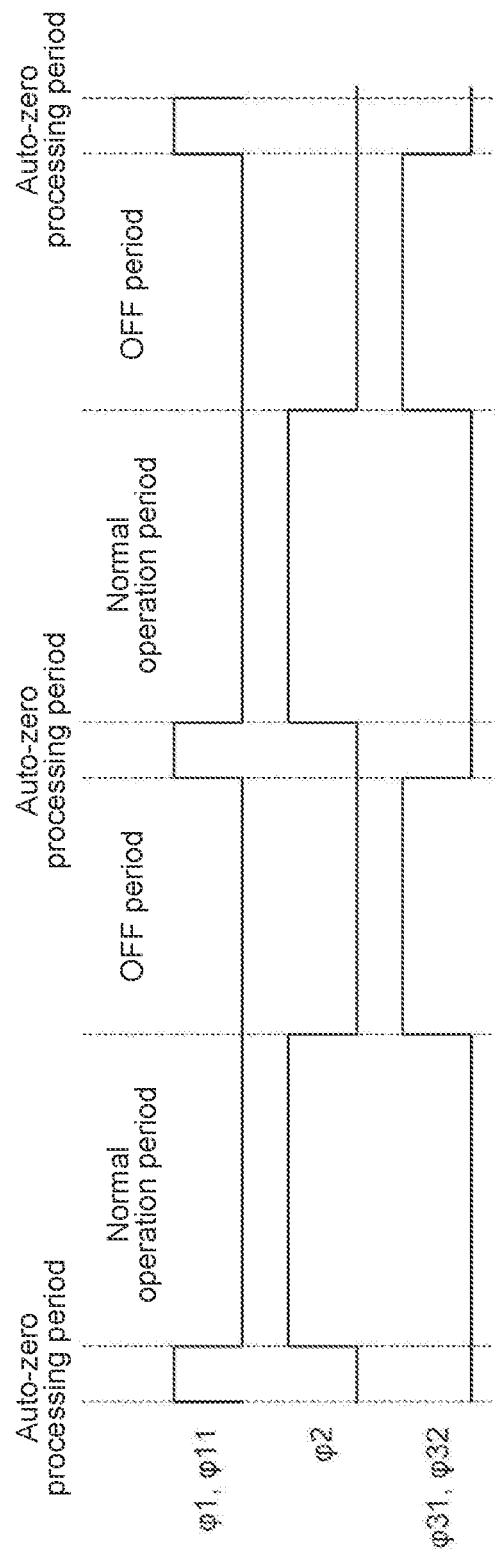
FIG. 8 is a timing chart illustrating timings at which switching is performed with respect to respective switches.

FIG. 8 illustrates timings at which switching is performed with respect to the switch φ1, the switch φ11, the switch φ2, the switch φ31, and the switch φ32. A period of a pulse ("H") of the switch φ1 and the switch φ11 indicates an auto-zero processing period for which auto-zero processing is performed, and a period of "H" of the switch φ2 indicates a normal operation period. A period of "H" of the switch φ31 and the switch φ32 indicates a period (an OFF period) for which an AD converter, from among a plurality of AD converters, that is not operating as an AD converter is stopped when the AD converter not being operating as an AD converter is not performing auto-zero processing.

Figure 9:
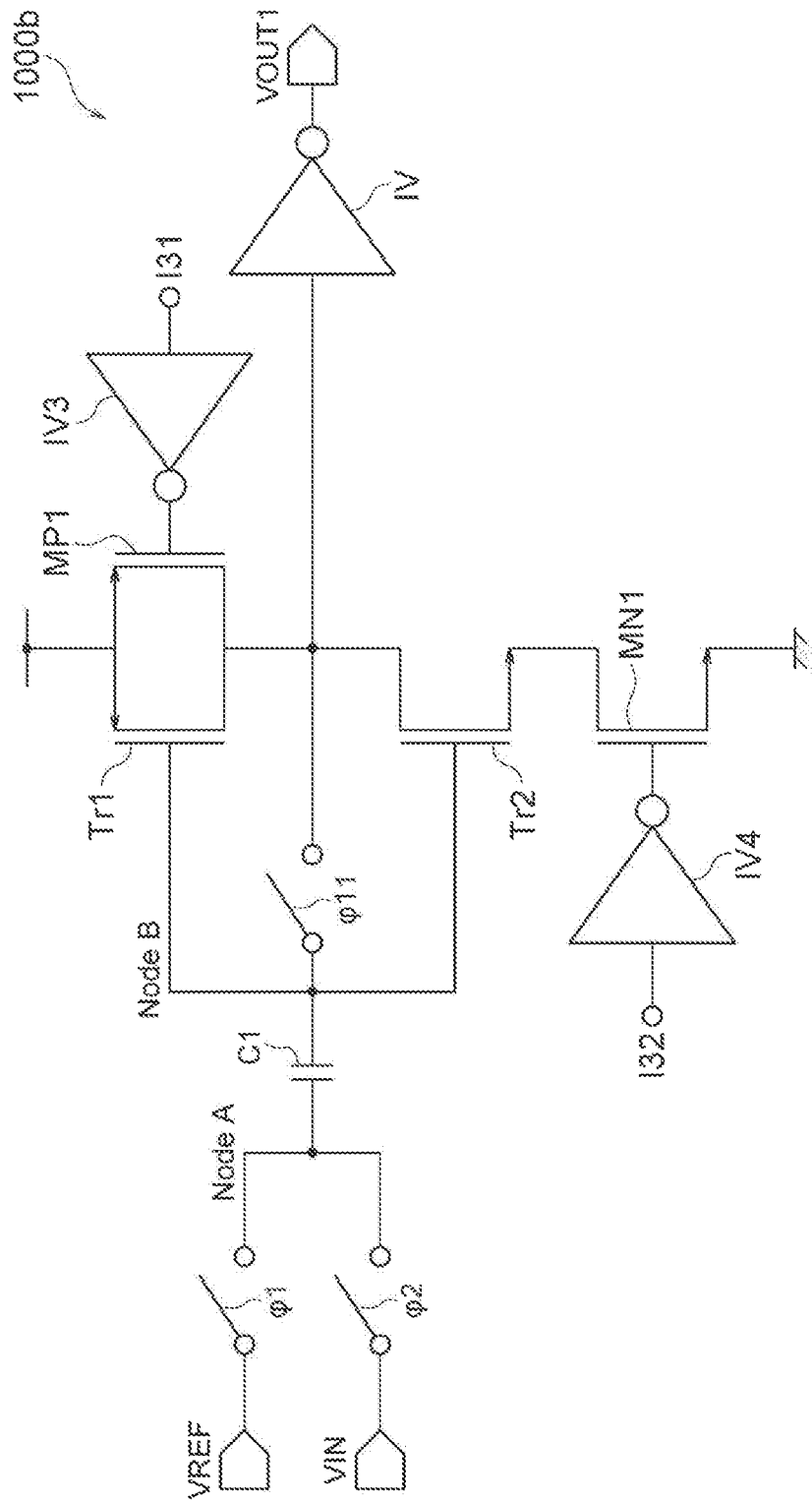
FIG. 9 is a block diagram of a modification of the configuration of the comparator controlled by the control circuits.

Next, a modification of the comparator of the second embodiment is described with reference to FIG. 9. FIG. 9 is a block diagram of a configuration of a comparator 1000*b* that is controlled by the control circuit CC1 and the control circuit CC2. Note that a component that is the same as a component of the comparator 1000 of the first embodiment illustrated in FIG. 2 is denoted by the same reference numeral as the component of the comparator 1000 of the first embodiment, and a description thereof is omitted as appropriate.

As illustrated in FIG. 9, the comparator 1000*b* is the comparator 1000 of the first embodiment illustrated in FIG. 2 further including a transistor MP1, a transistor MN1, an inverter IV3, and an inverter IV4. A signal of the same timing as a signal used to control the switch (01 is input to an input terminal I31 of the inverter IV3 (refer to FIG. 8), and a signal of the same timing as a signal used to control the switch φ32 is input to an input terminal I32 of the inverter IV4 (refer to FIG. 8).

Note that ON-OFF switching is performed with respect to the switch φ31, the switch φ11, and the switch φ2 of the comparator 1000*b* illustrated in FIG. 9 at the respective timings of the timing chart illustrated in FIG. 8.

The comparator 1000*b* includes an inverter (the transistor Tr1, the transistor Tr2) and a stop switch (the transistor MP1, the transistor MN1), in which output of the inverter is connected to a gate of the stop switch (the transistor MP1, the transistor MN1), and, in order to stop the comparator 1000*b*, a gate potential of the stop switch is fixed at a potential at which the stop switch is turned off. In this case, in the comparator 1000*b*, an inversion signal that is input to the input terminal I31 of the inverter IV3 is input to the transistor MN1, and an inversion signal that is input to the input terminal I32 of the inverter IV4 is input to the transistor MP1. Consequently, for example, signals input to the input terminal I31 and the input terminal I32 are in an "H" state, and gate voltages of the transistors MP1 and MN1 forming the stop switch are fixed at a gate potential ("L"), in order to stop the comparator 1000*b*.

Figure 10:
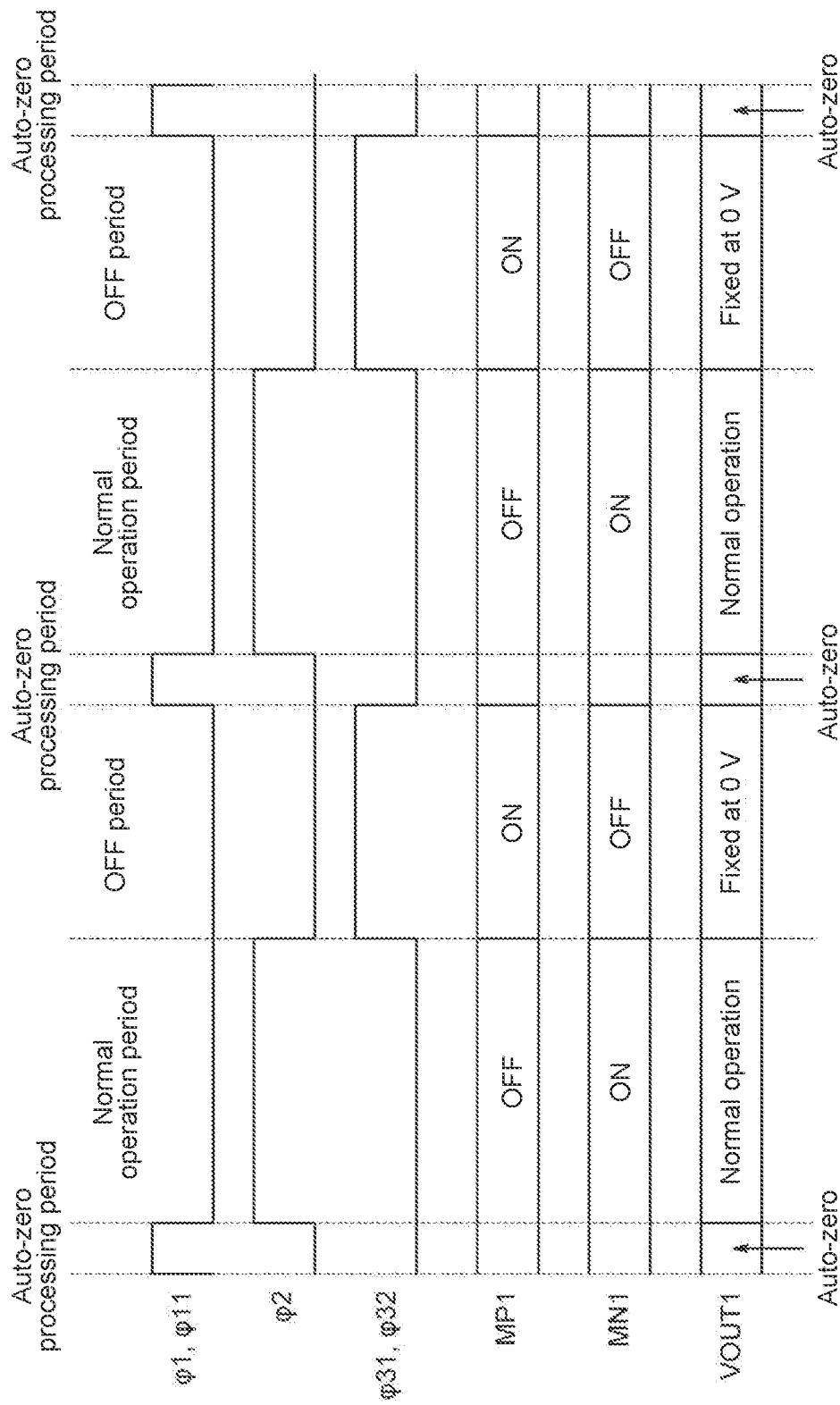
FIG. 10 is a timing chart of a signal of the comparator.

FIG. 10 illustrates a timing chart of a signal of the comparator 1000*b*. FIG. 10 is a timing chart of a signal of the comparator 1000*b*.

In FIG. 10, a period of a pulse ("H") of the switch φ1 and the switch φ11 indicates an auto-zero processing period for which auto-zero processing is performed. A period of "H" of the switch φ2 indicates a normal operation period for which a normal operation is performed. A period of "H" of the switch φ31 and the switch φ32 indicates a period (an OFF period) for which the comparator 1000*b* is stopped.

The transistor MP1 is turned off during a normal operation period, and is turned on when the switch φ31 and the switch φ32 are in an "H" state. Further, the transistor MN1 is turned on during a normal operation period, and is turned off when the switch φ31 and the switch φ32 are in an "H" state.

As described above, current flowing through the comparator 1000*b* can be stopped by shortening an auto-zero processing period for which auto-zero processing is performed and providing an OFF period. This results in being able to reduce power consumption.

As described above, according to the digitally controlled low dropout (LDO) regulator of the second embodiment according to the present technology, current flowing through the comparator 1000*b* not being performing comparison can be stopped by shortening an auto-zero processing period and providing an OFF period. This results in being able to reduce power consumption in the digitally controlled low dropout (LDO) regulator.

Note that the present technology is not limited to the embodiments described above, and various modifications may be made thereto without departing from the scope of the present technology.

Further, the effects described herein are not limitative but are merely illustrative, and other effects may be provided.

Furthermore, the present technology may also take the following configurations.

[1] A digitally controlled low dropout regulator, including:
a plurality of AD converters; and
an impedance variable circuit, each of the plurality of AD converters including a comparator, in which
a first signal from each of the plurality of AD converters is input to the impedance variable circuit,
a plurality of the first signals is input to the impedance variable circuit, and a second signal output from the impedance variable circuit is input to one of two terminals of each of the plurality of AD converters,
when one of the plurality of AD converters is in operation, another of the plurality of AD converters performs auto-zero processing to set a voltage value used as a reference, and
the comparator included in each of the plurality of AD converters compares a voltage value of the second signal input to the one of the two terminals with the set voltage value.

[2] The digitally controlled low dropout regulator according to [1], in which
each of the plurality of AD converters is an AD converter by which the auto-zero processing is to be performed.

[3] The digitally controlled low dropout regulator according to [1] or [2], further including
a control circuit, the control circuit including a pulse generating circuit, the pulse generating circuit generating a pulse used to perform the auto-zero processing.

[4] The digitally controlled low dropout regulator according to [3], in which
the pulse generating circuit includes a delay element and a computation element, the delay element delaying a timing of an input clock signal, the computation element performing computation with respect to the delayed clock signal and a non-delayed clock signal to generate a pulse.

[5] The digitally controlled low dropout regulator according to any one of [1] to [4], further including
a control circuit, in which
when the other of the plurality of AD converters is not performing the auto-zero processing, the control circuit stops the other of the plurality of AD converters.

[6] The digitally controlled low dropout regulator according to [5], further including
an inverter; and
a stop switch, in which
output of the inverter is connected to a gate of the stop switch, and
in order to stop the other of the plurality of AD converters, a gate potential of the stop switch is fixed at a potential at which the stop switch is turned off, and the comparator included in the other of the plurality of AD converters is stopped.

[7] The digitally controlled low dropout regulator according any one of [1] to [6], in which
the impedance variable circuit includes a plurality of impedance elements, and
the respective first signals from the plurality of AD converters are input to each of the plurality of impedance elements, and ON-OFF switching is performed with respect to each of the plurality of impedance elements according to values of the first signals.

REFERENCE SIGNS LIST

10 AD converter (phase A)
20 AD converter (phase B)
30 impedance variable circuit
40 voltage supply circuit
100 digitally controlled low dropout (LDO) regulator
200 adaptive voltage control system
1000 comparator
CC1, CC2 control circuit
PG pulse generating circuit

The invention claimed is:

1. A digitally controlled low dropout regulator, comprising:
a plurality of Analog-Digital (AD) converters; and
an impedance variable circuit, each of the plurality of AD converters including a comparator, wherein
a first signal from each of the plurality of AD converters is input to the impedance variable circuit,
a plurality of the first signals is input to the impedance variable circuit, and a second signal output from the impedance variable circuit is input to one of two terminals of each of the plurality of AD converters,
when one of the plurality of AD converters is in operation, another of the plurality of AD converters performs auto-zero processing to set a voltage value used as a reference, and
the comparator included in each of the plurality of AD converters compares a voltage value of the second signal input to the one of the two terminals with the set voltage value.

2. The digitally controlled low dropout regulator according to claim 1, wherein
each of the plurality of AD converters is an AD converter by which the auto-zero processing is to be performed.

3. The digitally controlled low dropout regulator according to claim 1, further comprising
a control circuit, the control circuit including a pulse generating circuit, the pulse generating circuit generating a pulse used to perform the auto-zero processing.

4. The digitally controlled low dropout regulator according to claim 3, wherein
the pulse generating circuit includes a delay element and a computation element, the delay element delaying a timing of an input clock signal, the computation element performing computation with respect to the delayed clock signal and a non-delayed clock signal to generate a pulse.

5. The digitally controlled low dropout regulator according to claim 1, further comprising
a control circuit, wherein
when the other of the plurality of AD converters is not performing the auto-zero processing, the control circuit stops the other of the plurality of AD converters.

6. The digitally controlled low dropout regulator according to claim 5, further comprising
an inverter; and
a stop switch, wherein
output of the inverter is connected to a gate of the stop switch, and
in order to stop the other of the plurality of AD converters, a gate potential of the stop switch is fixed at a potential at which the stop switch is turned off, and the comparator included in the other of the plurality of AD converters is stopped.

7. The digitally controlled low dropout regulator according to claim 1, wherein
the impedance variable circuit includes a plurality of impedance elements, and
the respective first signals from the plurality of AD converters are input to each of the plurality of impedance elements, and ON-OFF switching is performed with respect to each of the plurality of impedance elements according to values of the first signals.

\* \* \* \* \*